US009405832B2

(12) United States Patent
Edwards et al.

(10) Patent No.: US 9,405,832 B2
(45) Date of Patent: Aug. 2, 2016

(54) APPLICATION SEARCH QUERY CLASSIFIER

(75) Inventors: Catherine A. Edwards, San Francisco, CA (US); Alexander F. Braunstein, San Francisco, CA (US); Eva H. Mok, San Francisco, CA (US); Natalia Hernandez-Gardiol, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 987 days.

(21) Appl. No.: 13/566,800

(22) Filed: Aug. 3, 2012

(65) Prior Publication Data

US 2013/0325892 A1 Dec. 5, 2013

Related U.S. Application Data

(60) Provisional application No. 61/653,905, filed on May 31, 2012.

(51) Int. Cl.
*G06F 7/00* (2006.01)
*G06F 17/30* (2006.01)

(52) U.S. Cl.
CPC ................................. *G06F 17/30864* (2013.01)

(58) Field of Classification Search
CPC ............ G06F 17/30864; G06F 17/30643; G06F 17/30873; G06F 17/30973; G06F 17/30601; G06F 17/3071; G06F 17/30722
USPC ............... 707/737, 738, 751, 769, 999.003
See application file for complete search history.

(56) References Cited

U.S. PATENT DOCUMENTS

| 7,275,243 | B2* | 9/2007 | Gibbons et al. | 717/159 |
| 8,108,933 | B2* | 1/2012 | Mahaffey | 726/25 |
| 8,341,143 | B1* | 12/2012 | Karls et al. | 707/708 |
| 8,533,844 | B2* | 9/2013 | Mahaffey et al. | 726/25 |
| 8,577,879 | B1* | 11/2013 | Hotchkies et al. | 707/732 |
| 8,924,958 | B1* | 12/2014 | Bangur et al. | 717/178 |
| 2004/0260534 | A1* | 12/2004 | Pak et al. | 704/7 |
| 2004/0260677 | A1* | 12/2004 | Malpani et al. | 707/3 |
| 2007/0106662 | A1* | 5/2007 | Kimbrough et al. | 707/5 |
| 2011/0055256 | A1* | 3/2011 | Phillips et al. | 707/769 |
| 2011/0225019 | A1* | 9/2011 | Taylor et al. | 705/7.28 |
| 2011/0270819 | A1* | 11/2011 | Shen et al. | 707/707 |
| 2011/0314004 | A1* | 12/2011 | Mehta | 707/723 |
| 2012/0110174 | A1* | 5/2012 | Wootton et al. | 709/224 |

(Continued)

OTHER PUBLICATIONS

Oliver, Sam: "Apple Adds Keywords to App Store Additions for Easier Search", Internet, Jul. 29, 2009, pp. 1-1, XP 002714412, Internet. Retrieved from Internet: URL:http://appleinsider.com/articles/09/07/29/apple_adds_keywords_to_app_store_additions_for_easier_search.

*Primary Examiner* — Mohammed R Uddin
(74) *Attorney, Agent, or Firm* — Blakely, Sokoloff, Taylor & Zafman LLP

(57) ABSTRACT

A user can input a search query. By assessing terms in the search query, the search query can be categorized (e.g., as a navigational, functional or browse query). The categorization can depend on an analysis of terms in the search query, a preliminary search, and/or empirical data tied to previous and similar searches. For example, searches estimated to be directed to finding a specific app can be categorized as navigational, based on capitalized letters, quotation marks, a short number of words in the query, and a tight distribution of apps typically downloaded subsequent to viewing results from the search. Based on the categorization, a search strategy can be identified. Search strategies can differentially weight and/or use text-based strategies.

18 Claims, 10 Drawing Sheets

(56) References Cited

U.S. PATENT DOCUMENTS

| | | | |
|---|---|---|---|
| 2012/0173562 A1* | 7/2012 | Zhu et al. | 707/767 |
| 2012/0221384 A1* | 8/2012 | Avadhanam et al. | 705/14.4 |
| 2012/0221557 A1* | 8/2012 | Edmonds et al. | 707/723 |
| 2012/0240236 A1* | 9/2012 | Wyatt et al. | 726/25 |
| 2013/0191397 A1* | 7/2013 | Avadhanam et al. | 707/748 |
| 2013/0238608 A1* | 9/2013 | Sia et al. | 707/723 |
| 2014/0006409 A1* | 1/2014 | Prosnitz et al. | 707/740 |
| 2014/0297613 A1* | 10/2014 | Kasterstein et al. | 707/706 |

* cited by examiner

SEARCH QUERY: "BBC"

SEARCH QUERY: "News"

APPLICATION SEARCH QUERY CLASSIFIER

CROSS-REFERENCE TO RELATED APPLICATIONS

The present application is a non-provisional of and claims the benefit and priority of U.S. Provisional Application No. 61/653,905, filed on May 31, 2012, which is hereby incorporated by reference in its entirety for all purposes

BACKGROUND

The present disclosure relates generally to categorizing searches for software applications and to searching for software applications in a category-specific manner.

In recent years, application software or "apps" have become increasingly popular. Users can download apps onto mobile devices or computers. Some apps (e.g., game apps) are primarily for users' amusement. Some apps accomplish other utilities. For example, the apps may be provide directions, information about current events, recent activity of friends, or recipes. As these examples illustrate, apps can relate to a large variety of topics and life happenings.

App developers continue to develop new types of apps and to build upon existing apps (e.g., to create new versions). Users therefore have a large and increasing number of apps available to them. This variety can improve a degree to which the apps can meet user expectations. However, when a user wants to find an app to fill a particular need, the number of apps returned in a naïve keyword search can be overwhelming, and the order of the list may not be very relevant to the user's need. Such poor identification of relevant apps can make it difficult for the user to successfully find a suitable app that fills the user's need.

Accordingly, it is desirable to provide systems and methods for providing relevant apps to a user.

SUMMARY

Embodiments described herein can efficiently and effectively respond to users' search queries. Users can have different objectives while searching for apps. For example, some users are searching for a specific app which they know exist. Other users are searching for any app that performs a specific function. Still others want to merely peruse general apps related to a topic of interest. Thus, an analysis of terms in search queries and/or an analysis of empirical data associated with similar or same search queries can provide an estimate as to what type of search a user is attempting to perform. For example, searches for a specific app can be more likely to include capital letters and quotation marks, can be associated with fewer textual search results, and can frequently lead to a selection or download of a small subset of apps. As another example, searches for any app fulfilling a function can be more likely to include lower-case letters, can be associated with many textual search results, and can lead to a selection or download of a large variety of apps.

Certain embodiments of the present invention can provide categorizations of searches for apps. Different categories can then searched in a category-specific manner, thereby providing more relevant apps based on a user search query. For example, a user can input a search query. By assessing terms in the search query, the search query can be categorized (e.g., as a navigational, functional or browse query). The categories can include a navigational category (in which it is estimated that a user is searching for a particular app by name, such as "Angry Birds"), a functional category (in which it is estimated that a user is searching for an app that performs a function, such as "constellation identification"), or a browse category (in which it is estimated that a user wishes to explore a variety of apps, such as "best apps"). In various instances, the categorization can depend on: an analysis of terms in the search query (e.g., to determine whether it includes capital letters, a versioning word such as "pro" or "lite" or a browse word such as "top" or "best"); an analysis of a preliminary search (e.g., to determine a number of search results or a number of search results with a same name as terms in the query); and an analysis of previous and similar searches (e.g., to determine how frequently one or more apps were downloaded or purchased following presentation of search results).

Search-query categorization can improve search quality. For example, if a user is searching for a particular app, preferred search results can be identified in some instances by counting exact matches between search terms and title text. Meanwhile, if a user is searching for an app that fulfills a function, preferred search results can be identified in some instances by searching for apps with metadata text having similar meaning to the search terms and also having high user popularity. Not only can the categorization of search queries improve user satisfaction with the search, but it can also preserve system resources and improve search time by only considering specific search techniques in appropriate circumstances and by avoiding identification and transmission of search results likely not of interest to the user.

According to one embodiment, a method of responding to a search query requesting relevant software applications from a database of software applications is provided. The method can include receiving, at a server, the search query from an electronic device of a user, the search query including one or more terms. The method can also include analyzing the one or more terms to assign a first search category to the search request, the first search category being selected from a set of potential categories. The potential categories can include a navigational category and a functional category. The method can further include determining a search technique based on the first search category. The navigational category can be searched based on text associated with the software applications in the database, and the functional category can be searched based on a function of the software application in the database. The method can include using the determined search technique to search, at the server, the database for one or more relevant software applications based on the search request. The method can still further include sending, to the electronic device, a list of the one or more relevant software applications.

According to another embodiment, a method of categorizing search queries requesting relevant software applications from a database of software applications. The method can include receiving, at a server, first data from each of a set of devices identifying one or more search-query terms. The one or more search-query terms can be the same or equivalent across the set of devices. The method can also include receiving, at the server, second data from each of the set of devices indicating that a first user of the respective device requested a download of a software application or viewed additional information about the software application not available in a primary search-results presentation. The method can further include associating each app within a set of software applications with the one or more search-query terms. The set of software applications can include the software applications that were requested for download or for which additional information was viewed across all devices within the set of devices. The method can also include generating a distribution over the set of software applications and analyzing the distribution. The method can still further include associating the one or more search-query terms with a search category selected from a set of potential categories. The association of the one or more search-query terms with the search category can be based on the analysis of the distribution. One of the potential categories can be associated with an prediction that a second user who subsequently inputs the one or more search-query terms is to seeking access a software application already known to the second user. Thus, search results identified in response to a search query can be based at least in part on download requests made by other users who entered same or equivalent search-query terms.

Other embodiments are directed to systems and computer readable media associated with methods described herein.

These and other embodiments of the invention along with many of its advantages and features are described in more detail in conjunction with the text below and attached figures.

DETAILED DESCRIPTION

Certain embodiments of the present invention can provide categorizations of searches for apps. Different categories can then searched in a category-specific manner, thereby providing more relevant apps based on a user search query. For example, a user can input a search query. By assessing terms in the search query, the search query can be categorized (e.g., as a navigational, functional or browse query). The categories can include a navigational category (in which it is estimated that a user is searching for a particular app by name, such as "Angry Birds"), a functional category (in which it is estimated that a user is searching for an app that performs a function, such as "constellation identification"), or a browse category (in which it is estimated that a user wishes to explore a variety of apps, such as "best apps"). In various instances, the categorization can depend on: an analysis of terms in the search query (e.g., to determine whether it includes capital letters, a versioning word or a browse word); an analysis of a preliminary search (e.g., to determine a number of search results or a number of search results with a same name as terms in the query); and an analysis of previous and similar searches (e.g., to determine how frequently one or more apps were downloaded or purchased following presentation of search results).

Search-query categorization can improve search quality. For example, if a user is searching for a particular app, preferred search results can be identified in some instances by counting exact matches between search terms and title text. Meanwhile, if a user is searching for an app that fulfills a function, preferred search results can be identified in some instances by searching for apps with metadata text having similar meaning to the search terms and also having high user popularity. Not only can the categorization of search queries improve user satisfaction with the search, but it can also preserve system resources and improve search time by only considering specific search techniques in appropriate circumstances and by avoiding identification and transmission of search results likely not of interest to the user.

Figure 1:
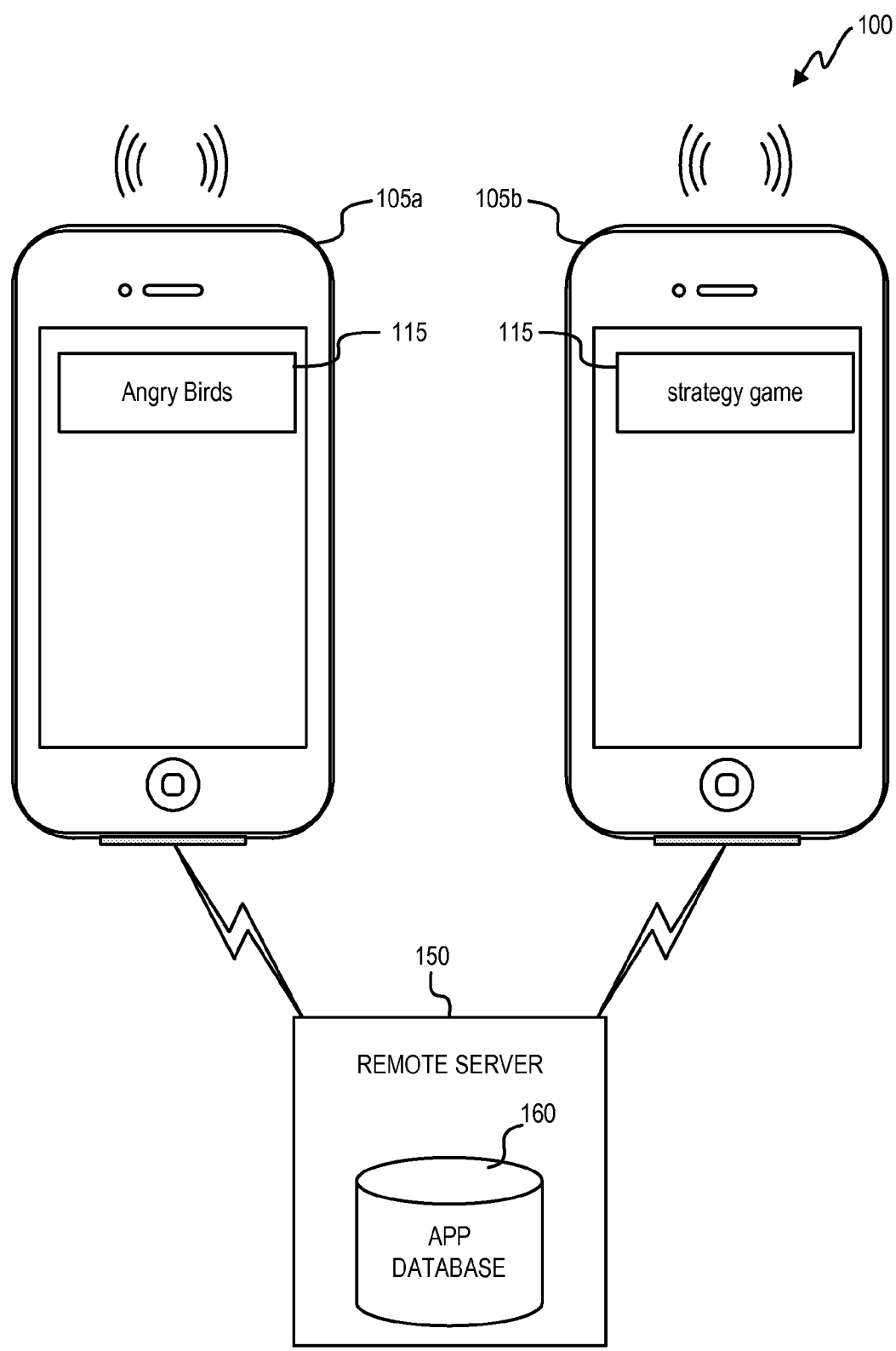
FIG. 1 illustrates a system for performing searches for apps.

FIG. 1 illustrates a system 100 for performing searches for apps. The searches can be performed at devices 105a and 105b. Devices 105a and 105b can execute software, such as operating software or program software, that enables a user to perform an app search and receive results of the search (e.g., as a list). Devices 105a and 105b can include mobile devices, which can include any device likely to be carried on a person of a user and capable of performing app searches as described herein. Devices 105a and 105b can include an electronic device, mobile phone, smartphone, tablet computer, laptop computer, or desktop computer.

Using a user-input component, a user can input a search query into device 105a or 105b. For example, a user can insert search-query terms using a touchscreen keypad, non-touchscreen keypad, touchscreen buttons, non-touchscreen buttons, or a mouse. Upon entry of the search query, the query can appear within a query box 115. In this illustration, a user of one mobile device 105a entered search-query text of "Angry Birds", and a user of another mobile device 105b entered search-query text of "strategy game."

The search query can be transmitted (e.g., wirelessly transmitted) from devices 105a and 105b to a remote server 150. Remote server 150 can use user terms of the search queries to search for apps associated with data in an app database 160. App database 160 can include titles, metadata, download frequency or count, user ranking, and/or the apps themselves. App database 160 can include a dynamic database, in which new apps are regularly or continuously added to the database. At least some apps can be contributed by third-party app developers. In some instances, remote server 150 classifies (categorizes) a search query, identifies a search strategy based on the categorization and then searches app database 160 using the identified search strategy. As used herein, "classification" and "categorization" can be used interchangeably.

In the illustrated example, the search query associated with device 105a appears to convey a different type of user search objective as compared to the search query associated with device 105b. Specifically, a user that input the "Angry Birds" query is likely seeking a particular app named "Angry Birds." Meanwhile, a user that input the "strategy game" query is not likely seeking a particular app named "strategy game", but is likely searching for a type of app characterized as a strategy game. Thus, it may be advantageous to require exact textual matches, a threshold number of matches, and/or title matches when performing a search associated with the "Angry Birds"

query, but it may be advantageous to perform a broader search (e.g., searching for synonyms and not requiring exact matches) when performing a search associated with the "strategy game" query.

To this end, remote server 150 can categorize the search query. Some categorizations can include navigational, functional and browse searches. The categorization can depend upon the search terms themselves (e.g., number of words, capitalization, quotes, or presence of browse-type words such as "best"), a preliminary search or previous searches for search-query terms or for equivalent terms (e.g., to identify a number of "exact hits" or a total number of search results), or user actions following previous searches for search-query terms or for equivalent terms.

For example, remote server 150 can identify a set of previous search queries for "Angry Birds". Remote server 150 can determine that a high proportion of users subsequently downloaded a single "Angry Birds" app or an app within an "Angry Birds" franchise. Thus, remote server 150 can estimate that the "Angry Birds" search is navigational. Meanwhile, remote server 150 can identify a set of previous search queries for "strategy game". Remote server 150 can determine that a broad range of apps were subsequently downloaded by users. Thus, remote server 150 can estimate that "strategy game" is a functional query.

Remote server 150 can then search app database 160 using a category-specific search query. For example, the search for "Angry Birds" can include a text-based search that looks for apps with the terms appearing multiple times and in the title. The search for "strategy game" can include a search that looks for the term or equivalent terms (e.g., "strategic game", "tactical puzzle", or "planning game") in the title or metadata and preferentially ranks popular apps (e.g., apps with high download frequencies or counts and/or apps with high user rankings).

Remote server 150 can transmit (e.g., wirelessly transmit) the "Angry Birds" search results back to device 105a and the "strategy game" search results back to device 105b. Devices 105a and 105b can present (e.g., display) some or all of the respective results to a user (e.g., in a list). A user can select an app of the displayed apps and further request a download of the app or purchase the app.

Figure 2:
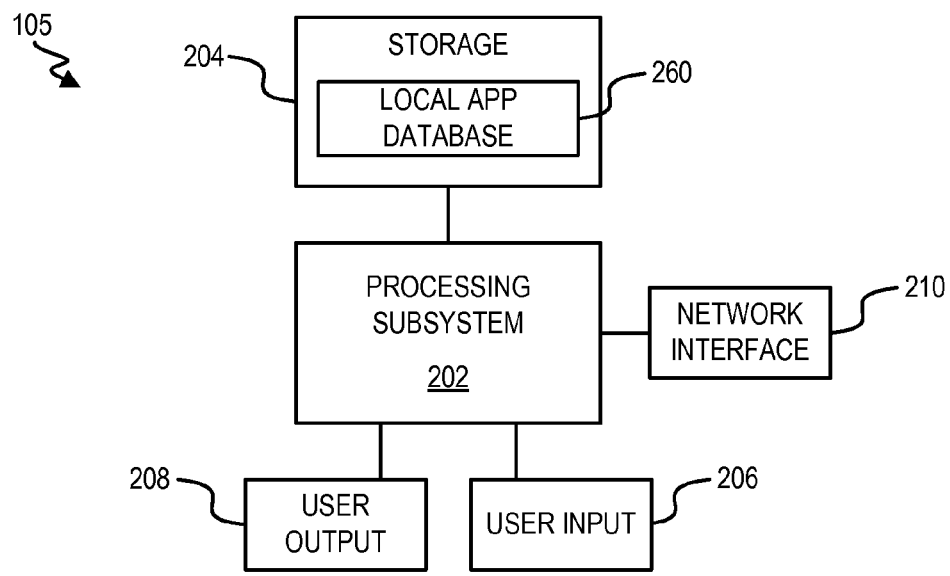
FIG. 2 is a simplified block diagram of an implementation of a device configured to receive user search queries according to an embodiment of the present invention.

FIG. 2 is a simplified block diagram of an implementation of a device 105 (e.g., device 105a or device 105b) configured to receive user search queries according to an embodiment of the present invention. Device 105 includes a processing subsystem 202, a storage subsystem 204, a user input device 206, a user output device 208, and a network interface 210.

Processing subsystem 202, which can be implemented as one or more integrated circuits (e.g., e.g., one or more single-core or multi-core microprocessors or microcontrollers), can control the operation of device 105. In various embodiments, processing subsystem 202 can execute a variety of programs in response to program code and can maintain multiple concurrently executing programs or processes. At any given time, some or all of the program code to be executed can be resident in processing subsystem 202 and/or in storage subsystem 204.

Through suitable programming, processing subsystem 202 can provide various functionality for device 105. For example, processing subsystem 202 can execute software (e.g., operating software) to allow a user to input search-query terms via user input device 206, to transmit search-query terms to remote server 150 via network interface 210, to view search results via user output, and/or interact with search results via user input device 206 and user output device 208 (e.g., to select, download or purchase a search-result app).

Processing subsystem 202 can further execute one or more apps identified in response to search queries, downloaded, and stored in a local app database 260.

Storage subsystem 204 can be implemented, e.g., using disk, flash memory, or any other storage media in any combination, and can include volatile and/or non-volatile storage as desired. In some embodiments, storage subsystem 204 can store one or more apps, stored in local app database 260, to be executed by processing subsystem 202. These apps can include apps downloaded by a user (e.g., via network interface 210) and apps identified based on search-query results. Programs and/or data can be stored in non-volatile storage and copied in whole or in part to volatile working memory during program execution.

A user interface can be provided by one or more user input devices 206 and one or more user output devices 208. User input devices 206 can include a touch pad, touch screen, scroll wheel, click wheel, dial, button, switch, keypad, microphone, or the like. User output devices 208 can include a video screen, indicator lights, speakers, headphone jacks, or the like, together with supporting electronics (e.g., digital-to-analog or analog-to-digital converters, signal processors, or the like). A user can operate input devices 206 to invoke the functionality of device 105 and can view and/or hear output from device 105 via output devices 208.

Network interface 210 can provide voice and/or data communication capability for device 200. For example, network interface 210 can provide device 105 with the capability of communicating with remote server 150. In some embodiments network interface 210 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), and/or other components. In some embodiments network interface 210 can provide wired network connectivity (e.g., Ethernet) in addition to or instead of a wireless interface. Network interface 210 can be implemented using a combination of hardware (e.g., antennas, modulators/demodulators, encoders/decoders, and other analog and/or digital signal processing circuits) and software components.

Figure 3:
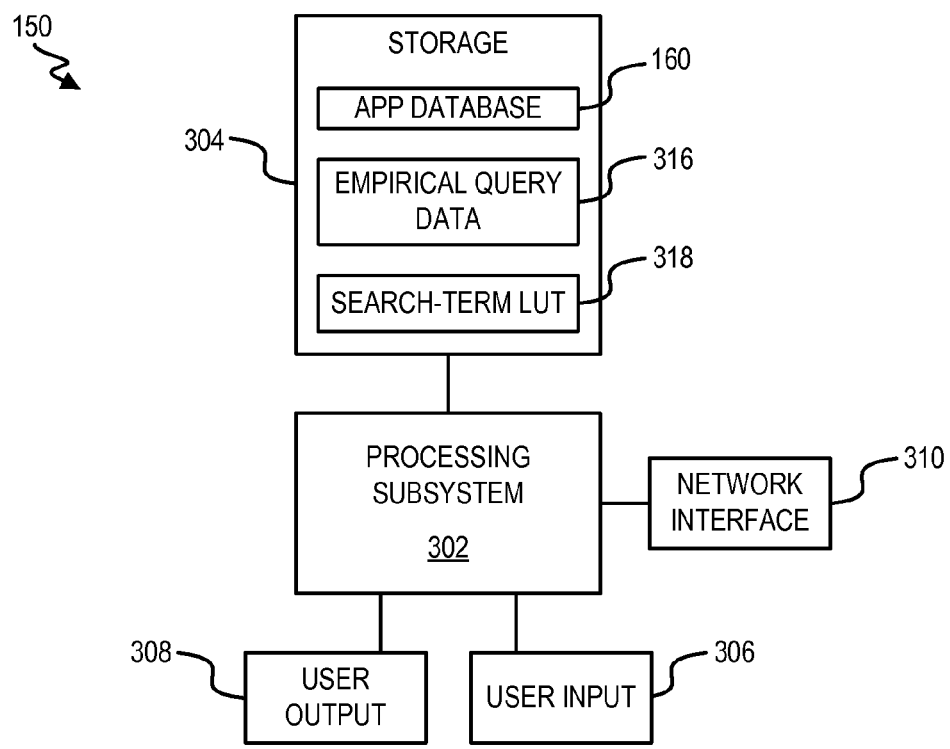
FIG. 3 is a simplified block diagram of an implementation of remote server for processing app searches according to an embodiment of the present invention.

FIG. 3 is a simplified block diagram of an implementation of remote server 150 for processing app searches according to an embodiment of the present invention. Remote server 150 includes a processing subsystem 302, storage subsystem 304, a user input device 306, a user output device 308, and a network interface 310. Storage subsystem 304, user input device 306, user output device 308 and network interface 310 can have similar or identical features as storage subsystem 204, user input device 206, user output device 208 and network interface 210 of device 105 described above.

Processing subsystem 302, which can be implemented as one or more integrated circuits (e.g., a conventional microprocessor or microcontroller), can control the operation of remote server 150. In various embodiments, processing subsystem 302 can execute a variety of programs in response to program code and can maintain multiple concurrently executing programs or processes. At any given time, some or all of the program code to be executed can be resident in processing subsystem 302 and/or in storage subsystem 304.

Through suitable programming, processing subsystem 302 can provide various functionality for remote server 150. Thus, remote server 150 can process search queries input at device 150 in order to identify search results. For example, processing subsystem 302 can generate and update classification information. In some instances, the classification information includes term-category associations, and processing subsystem 302 can generate, maintain and/or update the associations (e.g., based on a learning algorithm or user input). A "user" of remote server 150 can include a programmer and thus differ in characteristics as compared to a "user" of device 105 who can include a person using a functionality of a program or app. The browse category can be associated with terms such as games, music, video, free, apps, best, hot, or the like. The navigational category can be associated with versioning terms such as pro, light, lite, premium, 1, 2, 3, seasons, holiday, or the like. The functional category can be associated with terms such as "to do list", "fm radio", "restaurant guides", "that can", information, that, how, or the like. In some instances, the classification includes non-substantive query rules (e.g., associating queries having first-letter-capitalized words with a navigational category or associating queries having more than a threshold number of words with a functional category). Processing subsystem 302 can generate, maintain and/or update the non-substantive query rules (e.g., based on a learning algorithm or user input).

In some instances, the classification information is empirically based, and processing subsystem 302 can collect and aggregate query data, search-result data and/or user-response data (e.g., to associate a particular search term with a query frequency, number of results or distribution of apps downloaded subsequent to a presentation of the results). Processing subsystem 302 can collect the empirical data and store it in an empirical query database 316. Empirical query database 316 can be updated to remove or reduce the weight of older data and to add and/or weight newer data.

Processing subsystem 302 can store some or all of the classification information in a search-term look-up table (LUT) 318. Search-term LUT 318 can associate specific terms with a select category, category weightings and/or more detailed variables (e.g., a query frequency, a number of search results returned in response to the query using one or more search strategies or a distribution of apps downloaded by users after receiving search results). Search terms can include a single word, a set of words or a phrase. For example, in some instances, processing subsystem 302 detects individual words within a search query and performs the classification based on information associated with each word or some words. In some instances, processing subsystem 302 detects groups of words (e.g., bigrams or trigrams) and performs the classification based on information associated with each group. In some instances, processing subsystem 302 performs the search using all words in a query and/or using a combination of techniques (e.g., identifying information associated with each word, with each bigram, with each trigram, etc.). The classification information and/or search-term LUT 318 can be updated periodically or continuously based on, e.g., new user input or new empirical data.

Using the classification information, processing subsystem 302 can classify a particular query. For example, the query can be assigned to one or more of the following categories: navigational, functional, browse, location-based, and price-based. A single query can be assigned to one, more, or a fixed number of categories. One or more of the categories can be exclusive. To illustrate, in one instance, assigning both the "navigational" and "functional" categories to a single search query can be prohibited. The classification can be determined, e.g., by looking up one or more search-query terms within search-term LUT 318.

Processing subsystem 302 can identify a search strategy based on the classification perform a search for one or more apps within app database using the search strategy. The search can include identifying which apps in app database 160 fulfill a particular criteria (e.g., having at least part of a title that exactly matches terms in the search query or include one or more search-query terms at least a threshold number of times within their metadata). In some instances, a ranking score is generated for each app in the app database, the ranking score being based on a comparison between app characteristics and search-query terms (e.g., a count of search-query terms in a title or a metadata). The ranking score can be adjusted or a new score can be generated to assess other app features. For example, a popularity score can depend on a number or frequency or previous downloads or user ratings.

Results from the search can be transmitted from remote server 150 to device 105 in one or more transmissions. Device 105 can present the search results to the user via the user output device 208. For example, for each search result, one or more of the following information types can be presented for the app: its name, publisher, price, category, brief description, number of downloads, average rating, device compatibility, size, version, update date, languages, screen shots, and/or user reviews. In some instances, some types of information are initially presented (e.g., in a list or grid presentation of the search results), and other types of information are available upon a user selecting a search resulting. For example, an initial list display can identify "Angry Birds", note its price, publisher and category. A user can then select (e.g., tap or click) on the app representation, and a brief description, number of downloads, average rating, device compatibility, size, version, update date, languages, screen shots and/or user reviews can be further presented for the app.

A user can choose to download one of the apps presented in the search results by interacting the with user input device 206. Device 105 can transmit a request for the app to remote server 150 via network interface 210. Device 105 can additionally (in a same or different transmission) or alternatively send other types of information, such as which apps the user selected to view an extended information profile. Remote server 150 can respond to the app request by transmitting the requested app to device 105 via network interface 310. In some instances, device 105 or remote server 150 can require, e.g., payment information (e.g., a credit-card number and expiration date, financial-system login information, and/or payment authorization) from a user prior to transmitting a request for the app to remote server 150, transmitting the app to device 105, or providing the app to the user. Remote server 150 can update its empirical query data 316 based on, e.g., the download request or other information that was provided (e.g., which apps were viewed).

It will be appreciated that device 105 and remote sever 150 described herein are illustrative and that variations and modifications are possible. A device 105 can be implemented as a mobile electronic device and can have other capabilities not specifically described herein (e.g., telephonic capabilities, power management, accessory connectivity, etc.). In a system with multiple devices 105 and/or multiple remote servers 150, different devices 105 and/or remote servers 150 can have different sets of capabilities; the various devices 105 and/or remote servers 150 can be but need not be similar or identical to each other.

Further, while device 105 and remote server 150 are described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Additionally, while device 105 and remote server 150 are described as singular entities, it is to be understood that each can include multiple coupled entities. For example, remote server 150 can include, a server, a set of coupled servers, a computer and/or a set of coupled computers.

Figure 4:
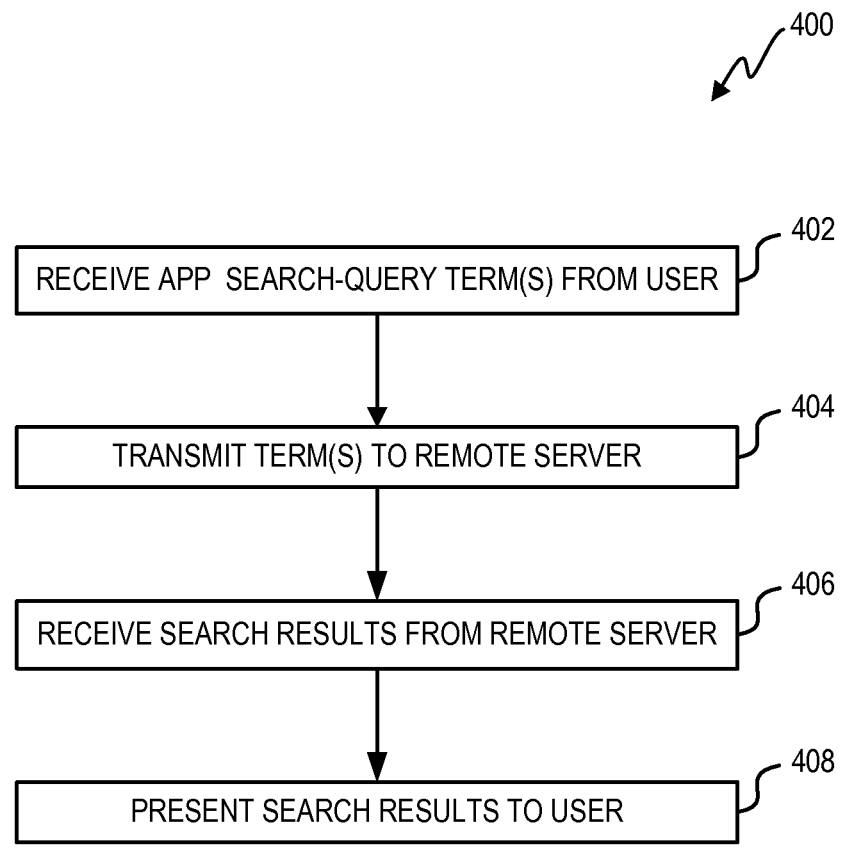
FIG. 4 is a flow diagram of a process for using a device to search for apps according to an embodiment of the present invention.

FIG. 4 is a flow diagram of a process 400 for using a device to search for apps according to an embodiment of the present invention. Process 400 can be implemented, e.g., in device 105 of FIG. 2.

At block 402, device 105 receives one or more app search-query terms from a user of device 105. The user can enter the terms, e.g., using a user input device 206, such as a touchpad or keyboard. The user can enter the terms, e.g., in a search box or query box displayed on a screen or by selecting a search application or function. After a user is satisfied with the entered terms, the user can press or click a button (e.g., displayed on the screen) or press a key (e.g., an "Enter" key) to indicate that the search term(s) have been completely entered. Device 105 can then receive the completed search-query term(s).

At block 404, the search-query term(s) can be transmitted from device 105 to remote server 150 (e.g., via network interface 210). In some instances, the search-query term(s) are wirelessly transmitted. The transmission may further identify device 105 (e.g., via an IP address), the user, device capabilities, a language setting, search-result settings (e.g., a number of results to be presented on one page or in total), previous search-query terms, and/or previous app downloads.

At block 406, one or more search results can be received at device 105 from remote server 150, the search results being responsive to the search query. Each search result can identify an app and can include information about the app, such as it: name, publisher, price, category, brief description, number of downloads, average rating, device compatibility, size, version, update date, languages, screen shots and/or user reviews. In some instances, the returned information depends at least partly on search-result settings (e.g., default settings or user-defined settings). For example, a user can define settings to indicate that all results are to indicate an app publication or update date and no results are to indicate an app's size. Remote server 150 can then tailor the transmitted information to match the settings, or device 105 can locally select amongst available data to match the settings.

At block 408, the search results are presented to the user. The search results can be presented, e.g., as a linear list or a grid-style list. The search results can be ordered such that search results estimated to best match the search query are presented before other search results (e.g., above other search results). An initial presentation of the search results, in some instances, only includes some of the app-related information available for the search results.

The search results can be presented in a manner that allow for the user to interact with one or more results. For example, a user may be able to select one search result, and additional information about the selected search result can be presented (e.g., on a new page, a pop-up window or on a current page). As another example, a user may be able to request a download of a search-result app. In some instances, downloading an app (e.g., an app that is not free) can require purchasing the app.

Figure 5:
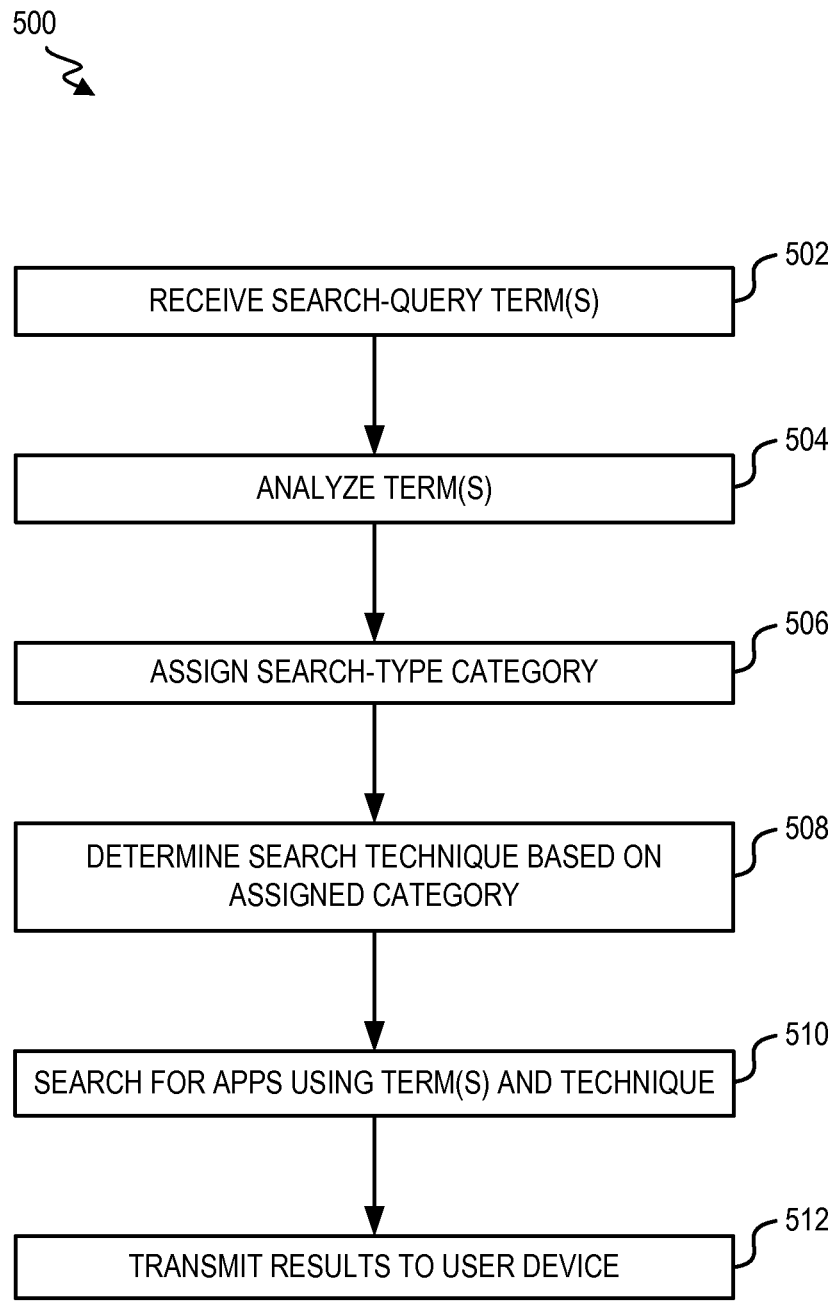
FIG. 5 is a flow diagram of a process for searching for apps according to an embodiment of the present invention.

FIG. 5 is a flow diagram of a process 500 for searching for apps according to an embodiment of the present invention. Process 500 can be implemented, e.g., in remote server 150 of FIG. 3.

At block 502, one or more search-query terms are received. For example, the search-query term(s) can be received from device 105. The search-query terms can be accompanied by a search request (e.g., identifying a database, user settings or device capabilities or including a general request) or a search request can be implicit in receipt of the search-query terms.

At block 504, the received terms are analyzed. The analysis can allow remote server 150 to assign one or more search-type categories to the search-query term(s) at block 506. The analysis can include one or more pre-processing steps, such as correcting spelling or changing plural terms to singular terms. In some instances, the analysis includes determining one or more quantitative variable values associated with the search terms, and the search-type category is assigned based on the values (e.g., by identifying a highest value amongst category-associated values or comparing a value to a threshold). In some instances, the analysis includes determining whether the search-query term(s) meet a criteria (e.g., whether they include a navigational term).

In some instances, the analysis includes use of a look-up function. Specifically, remote server 150 can look up one, more or all of the search-query term(s), e.g., in a search-term LUT 318. As one example, search-term LUT 318 can directly associate a term with a search-type category. For example, "best" can be associated with a "browse" category, "Angry Birds" can be associated with a "navigational" category, and "strategy games" can be associated with a "functional" category. The association can be based on empirical data and/or previously performed quantitative analyses (e.g., assigning a "navigational" category when an above-threshold portion of users subsequently download an app with a title exactly matching the term, assigning a "functional" category when a large variety of apps are subsequently downloaded, and assigning a "browse" category when a below-threshold percentage of users subsequently download any app).

As another example, search-term LUT 318 can associate a term with one or more scores (e.g., normalized scores). For example, "strategy game" can be associated with a set of scores: [0.05,0.0 85, 0.45], the scores respectively corresponding to navigational, functional and browse categories. These scores may indicate that it is most likely that "strategy game" is a functional search and least likely that it is a navigational search.

As yet other examples, search-term LUT 318 can associate a term with a number of search results from a previous search or a number of times that the term has previously been received in search queries. Search-term LUT 318 can associate a term with a click-through rate (CTR) that indicates what fraction of users that previously initiated a query with the term selected: a specific app for additional information ("top CTR"), one of a top n number of apps for additional information ("cumulative CTR"), or an app with a name exactly matching the term ("exact-term CTR"). Search-term LUT 318 can associate a term with a download rate or buy rate (BR) that indicates what fraction of users that previously initiated a query with the term bought or downloaded: a specific app ("top BR"), one of a top n number of apps ("cumulative BR"), or an app with a name exactly matching the term ("exact-term BR"). Search-term LUT 318 can associate a term with an absolute number of how many times a specific app, a set of apps or an app with a name exactly matching the term were selected for additional information, bought or downloaded. Search-term LUT 318 can associate a term with an average or maximum user rating for specific app, a set of apps or an app with a name exactly matching the term.

Some search queries can include a set of words. A term can be defined based on a number of words (e.g., a term is one word) or provided with more flexibility (e.g., such that "Tetris", "Angry Birds" and "Cows in Space" are each terms within search-term LUT 318). Thus, in some instances, an entire search string is equated to a term irrespective of a number of words in the string. In some instances, the search string is parsed into multiple terms. The parsing can be systematic. For example, every word-based parsing with successive-word terms may be performed (e.g., parsing a three-word string into 3 one-word terms, 1 two-word term with the first two words and 1 one-word term with the last word, 1 one-word term with the first word and 1 two-word term with the last two words, and 1 three-word term).

While search-term LUT 318 is referred to in a singular tense, it will be understood that multiple search-term LUTs 318 can instead be utilized. For example, a first search-term LUT can associate a search term with a number of previous queries with the term and a second search-term LUT can associate a search term with a top CTR.

In some instances, the analysis performed at block 504 includes an analysis different from a look-up function. For example, the analysis can determine what fraction of words within the query are capitalized, how many words are in the query, capitalization characteristics (e.g., average percentage of queries in which at least one word after the first word was capitalized) of previous identical queries.

In some instances, the analysis includes scanning a search-query string for one or more words, numbers or terms. The words, numbers or terms can include those likely to be associated with a search-type category. For example, a list of words associated with a "browse" category can include games, music, video, free, apps, best and hot. A list of words associated with a "navigational" category can include versioning words, such as, pro, light, lite, premium, 1, 2, 3, seasons and holiday.

The analysis at block 504 can include determining a number of factors. For example, the analysis can be separately performed for different terms within a search string. As another example, the analysis can include determining values for different types of variables, such as a number of words in a query, a cumulative CTR for a search-query term, and a binary indication as to whether the search string includes a browse-associated or navigational-associated term. Thus, the analysis at block 504 can include aggregating the factors. At least some of the factors or all of the factors can be quantitative, and so the aggregation can include a quantitative technique, such as averaging or summing raw, weighted or normalized values. The aggregation can also or alternatively include comparing one or more of the pre-aggregated or post-aggregated values to a threshold. The aggregation can further include identifying an extreme value (e.g., an extreme value from amongst a set of values, each value being associated with a different potential search-type category).

The analysis at block 504 can include implementation of a learning algorithm, such as a support vector machine or neural network. The learning algorithm can be trained using training data, user responses indicating satisfaction with search results, or a ranking of a selected or downloaded app amongst the presented search results. Thus, in some instances, the learning algorithm can dynamically learn in real-time. The learning algorithm can receive, as inputs, search-query terms and can produce, as outputs, a search-type category. The learning algorithm can further access information related to the search-query terms which may serve as hidden variables. This information can include any term-associated information identified herein, such as a cumulative BR and average user rating value. The learning algorithm can adjust weights and dependencies as it learns.

At block 506, the search query is assigned to a search-type category based on the analysis. The search-type category can be assigned by, e.g., identifying a highest value from a set of values, each value being associated with a different category; determining whether one or more values exceed a threshold, or determining whether a criterion associated with a category has been met. In some instances, the analysis itself outputs the search-type category to be assigned.

The assignment can be restricted to assignment to a single category or can include multiple categories, e.g., with varying weights assigned to each category. In some instances, at least some categories are exclusive such that a search query cannot be assigned to multiple of the exclusive categories.

At block 508, a search technique is determined based on the assigned search-type category. For example, a search technique's reliance on text-based searches, title-based searches, metadata searches, category-specific searches and/or category-based searches can vary depending upon an assigned search-type category. Emphasis on text-based searches and/or title-based searches can be, e.g., particularly advantageous for navigational searches, while they can be less advantageous for functional and/or browse searches. Further, a search technique's reliance on popularity metrics, such as a number or rate of "clicks" (or selection for additional information), a number or rate of downloads, a number of rate of purchases, a number of user reviews, a maximum user rating, and/or an average user rating can vary depending upon an assigned search-type category. Emphasis on user ratings can be, e.g., particularly advantageous for browse searches, while they can be less advantageous for navigational searches. The search technique can influence, e.g., how a database is searched, how search results are ranked, and/or how many of the search results are transmitted to device 105.

At block 510, a search for apps is conducted using the received search-query term(s) and the determined search techniques. The terms used for the app search at block 510 can be the same or can differ from terms used during the analysis of terms at block 504. For example, in some instances, block 504 can individually analyze each word within a search string. Upon assigning the search query to a navigational term, a full-string term can be used to search for apps. Remote server 150 can search for apps within app database 160. For example, the search can including searching for search-query terms in titles or metadata in the app database and/or searching for apps associated with particular user-review or user-action characteristics (e.g., download counts).

At block 512, results of the search are transmitted to device 105. Each search result can include an app's name, developer, development date, update date, version, category, price, brief description, average user rating, screen shot, avatar, device compatibilities, and/or languages. The search results can be ranked or ordered, with highly ranked results best matching the search-query terms according to the determined search technique. A number of transmitted results can depend upon, e.g., user settings, a number of results that met a criteria, and/or the determined search technique.

Figure 6:
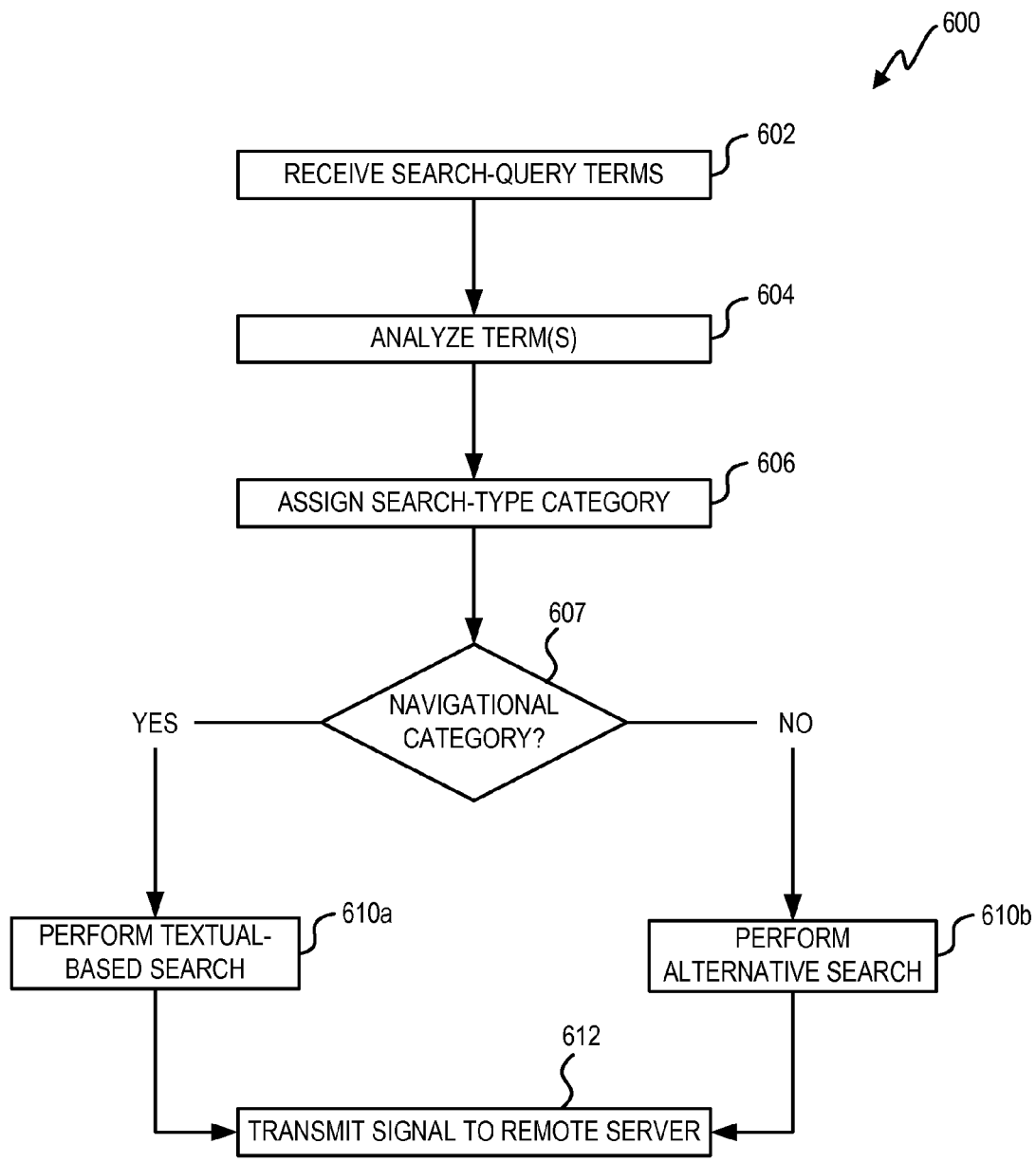
FIG. 6 is a flow diagram of another process for searching for apps according to an embodiment of the present invention.

FIG. 6 is a flow diagram of another process 600 for searching for apps according to an embodiment of the present invention. Process 600 can be implemented, e.g., in remote server 150 of FIG. 3. Block 602, 604, 606 and 612 can be similar or identical to corresponding blocks of process 500 described above.

In the embodiment shown in FIG. 6, at block 607, it is determined whether the search-type category assigned at block 606 includes a navigational category. If so, a textual-based search is performed at block 610a. Otherwise, an alternative search is performed at block 610b. When a search is performed, the search technique can attempt to identify search results based on criteria. In essence, the search technique can credit some potential search for meeting a criterion and not credit others not meeting the criterion. The credit and criterion matching need not be binary. For example, in the textual-based search, an app can be "credited" for each instance within the app's metadata at which a search-query term appears.

If a user enters an app title as a search query, crediting an app in this manner can be advantageous, as a developer can continually recite the app's title in the title itself and throughout the app's metadata. Meanwhile, if a user is searching for a characteristic or function of an app, it can be less likely that a desired app repeatedly uses one or more terms from the search query. Thus, the alternative search of block 610b can emphasize app-specific user interactions (e.g., selections for additional information, downloads or purchases) or ratings moreso than the textual-based search of block 610a.

While FIG. 6 lists the search as an "alternative search", in some instances, the alternative search continues to utilize a textual-based search. Similarly, the textual-based search of block 610a can additionally use other non-textual search techniques. However, the emphasis on the textual-based search can be less pronounced within the alternative search of block 610b as compared to the textual-based search of block 610a. For example, at block 610a, a textual-based search could be associated with a weight of 0.8 and other search techniques (e.g., based on user rankings or synonym detection) could be associated with a weight of 0.2, and at block 610b, the textual-based search could be associated with a weight of 0.4 and same or different other search techniques could be associated with a weight of 0.6.

Figure 7:
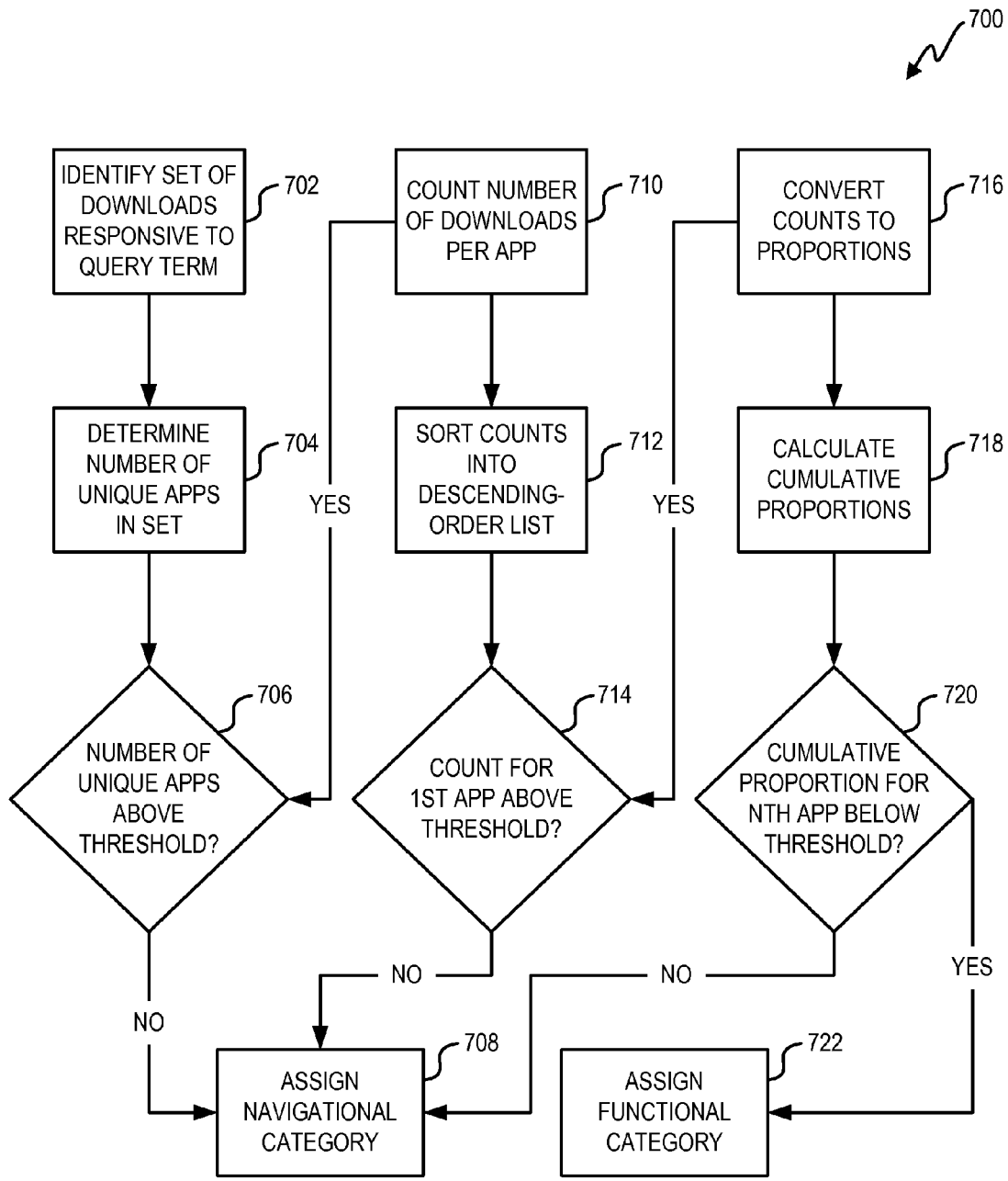
FIG. 7 is a flow diagram of a process for analyzing a search term and assigning a search-type category according to an embodiment of the present invention.

FIG. 7 is a flow diagram of a process 700 for analyzing a search term and assigning a search-type category according to an embodiment of the present invention. Process 700 can be implemented, e.g., in remote server 150 in FIG. 3. In various embodiments, process 700 can be performed dynamically in response to a search query and/or used to determine assignments for search-term LUT 318.

At block 702, a set of downloads made responsive to a query having an instant search-query term are identified. For example, requests for app downloads can indicate whether the identified app was included in a search-result list, and, if so, a search query associated with the search-result list. As another example, remote server 150 can track search queries and determine whether a download request was received within a time window and prior to a subsequent search query from a device 105 provided the search results. Remote server 150 can thus identify and store search-query terms associated with app downloads, and empirical app downloads responsive to a particular query term can be identified at block 702. Thus, as a result of block 702, a set of app downloads can be accessed.

At block 704, a number of unique apps within the set of downloaded apps can be determined. At block 706, it can be determined whether the number of unique apps exceeds a first threshold. If not, the search-query term can be assigned to a navigational category at block 708. If so, process 700 continues to block 710.

At block 710, for each app, a number of downloads is determined for the set. As a simplistic example, if the set included Apps A, B, and C, the count could indicate that App A was downloaded 164 times, App B was downloaded 354 times and App C was downloaded 44 times. At block 712, the counts are sorted into a descending-order list. Thus, an app associated with the most downloads within the set is listed first. In the above example, the list would be: 354, 164, and 44.

At block 714, it is determined whether a download count associated with the first app within the descending-order list (i.e., whether the first number in the list) exceeds a second threshold. If not, the search-query term can be assigned to a navigational category at block 708. If so, process 700 continues to block 716.

At block 716, the counts are converted to proportions, e.g., by dividing the app-specific counts by the total counts within the list. The proportions can be performed in any manner to normalize the data. In the above example, the proportion-converted list would be 0.63, 0.29 and 0.078. At block 718, cumulative proportions are calculated, the cumulative proportions summing all proportions prior to and including an instant proportion. In the above example, the cumulative-proportion list would be 0.63, 0.92, and 1.0. At block 720, it is determined whether a cumulative proportion for an nth app in the list is below a third threshold. If not, the search-query term can be assigned to a navigational category at block 708. If so, the search-query term can be assigned to a functional category at block 722.

Thus, in this example, three criteria must be met in order for a search-query term to be assigned to a functional category. The criteria are that the search-query term is associated with a relatively large number of unique search results, leads to downloading of at least one app relatively frequently, and the app distribution has a relatively long tail.

It will be appreciated that FIG. 7 could be modified to include more or less criteria and/or different criteria. For example, in one instance, the criteria could relate to selection of a search result for additional information, user ratings and/or frequency at which the search-query term is received.

Figure 8A:
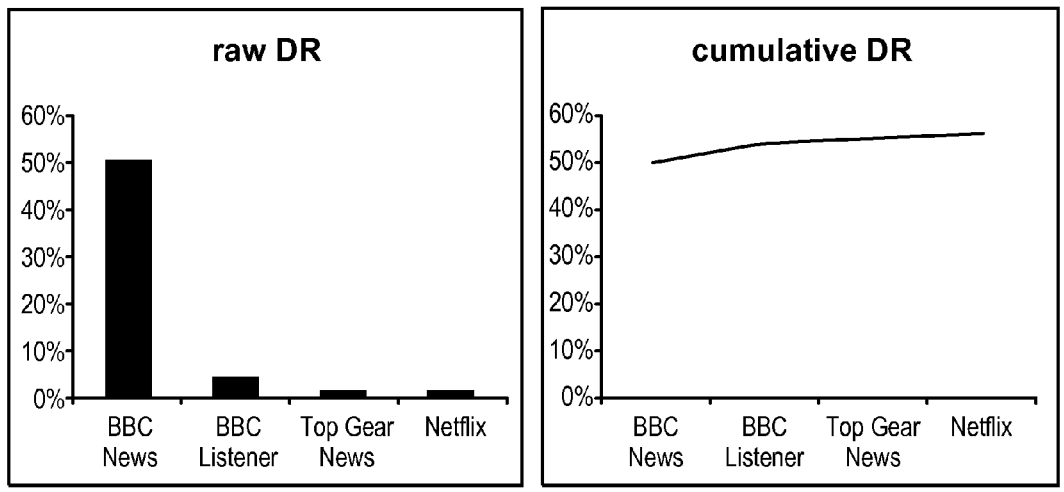
FIGS. 8A-8B illustrate examples of download rates associated with two search queries.
Figure 8B:
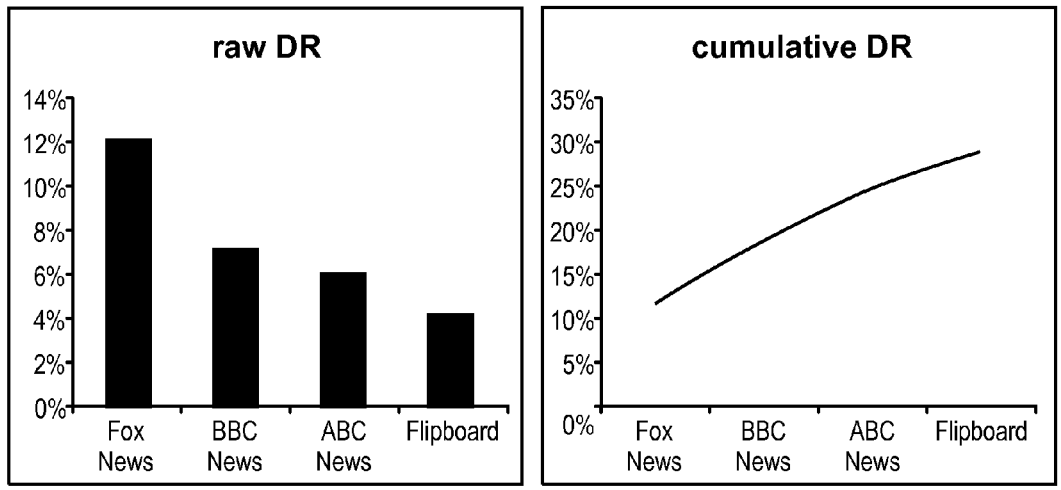

FIGS. 8A-8B illustrate examples of download rates associated with two search queries. In FIG. 8A, the search query is for "BBC". The search led to downloads of 1104 unique apps. The four most frequently downloaded apps were BBC News, BBC Listener, Top Gear News and Netflix. The left plot in FIG. 8A shows the app downloads for these four apps as a percentage of all app downloads associated with the search query. BBC News accounted for 50% of the downloads, BBC Listener for 4% and Top Gear News and Netflix for 1% each. The other 1100 apps accounted for even smaller contributions. The right plot in FIG. 8A shows the cumulative download rate. Due to the large contribution of BBC News and the small contributions of the other app, the cumulative download rate is rather flat subsequent to the BBC-News point.

In FIG. 8B, the search query is for "News". The search led to downloads of 2212 unique apps. The four most frequently downloaded apps were Fox News, BBC News, ABC News and Flipboard. The left plot in FIG. 8B shows the app downloads for these four apps as a percentage of all app downloads associated with the search query. Fox News accounted for 12% of the downloads, BBC News for 7%, ABC News for 6% and Flipboard for 4%. The other 2208 apps accounted for smaller contributions. The right plot in FIG. 8B shows the cumulative download rate. Because the predominance of the most-downloaded app is diminished in FIG. 8B as compared to FIG. 8A, the cumulative plot does not show as much stability subsequent to the Fox-News point.

The cumulative plots illustrate the application of the criterion set forth in block 720 of FIG. 7, which assesses whether a cumulative proportion for an nth app is below a threshold value. In FIG. 8A, half of the users downloaded a single app. Thus, the cumulative download rate hovered around the 50% level for all four depicted apps. Meanwhile, there was less consistency in app downloads for FIG. 8B, and the cumulative download rate very gradually climbed—not reaching the 50% mark even after all four of the most popular apps were accounted for. The low cumulative download rates, e.g., at the Flipboard point indicate that users are downloading a variety of apps responsive to the search. Thus, a functional categorization can seemingly well-characterize this instance. Meanwhile, in FIG. 8B, half of the users downloaded a single app, suggesting that users had a specific app in mind and would desire a navigational categorization.

Figure 9:
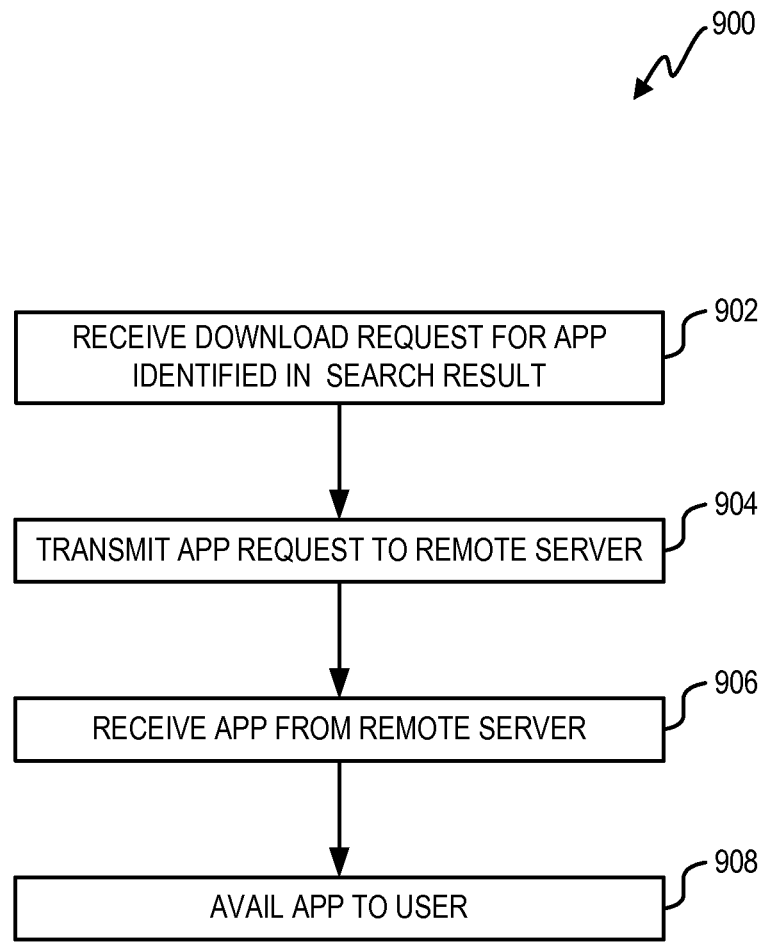
FIG. 9 is a flow diagram of a process for providing user interaction data to remote server 150 according to an embodiment of the present invention.

As noted herein, in some instances, categorization of a search query depends on an analysis of which apps users "clicked' (or selected for additional information to be presented), downloaded or purchased. FIG. 9 is a flow diagram of a process 900 for providing user interaction data to remote server 150 according to an embodiment of the present invention. Process 900 can be implemented, e.g., in device 105 in FIG. 2. In some instances, process 900 is performed subsequent to presentation of search results (e.g., subsequent to block 408 of process 400 in FIG. 4).

At block 902, a request for download of an app identified in a search result is received. For example, device 105 can detect that a user selected a visible "download" option. In some instances, the detection includes a purchase of an app. For example, a user can authorize a payment for the app and/or enter payment information, wherein the user is requesting and expecting a download of the app as a result of the purchase.

At block 904, the app request is transmitted (e.g., wirelessly transmitted) from device 105 to remote server 150. The app request can include, e.g., a name of the app, an identifier (e.g., a numeric identifier) of the app, a version of the app, and/or a language of the app. The app request can include a device identifier (e.g., IP address), device characteristics and/or device capabilities. In some instances, the app request can include information about the search results or a search query giving rise to the search query.

At block 906, device 105 can receive the app from remote server 150. At block 908, the app is availed to a user of device 105. For example, the app can be stored at local app database 260 such that a user can access (e.g., load and use) the app.

It will be appreciated that process 900 can be modified to convey other types of search-result interactions or app interactions to remote server 150. For example, device 105 can identify whether a user selected an app from a search-result list for more information, whether a user purchased the app, or how frequently a user used an app after download. Each of these identifications can be tied to a search query, such that remote server 150 can collect interaction data specific to the query.

Figure 10:
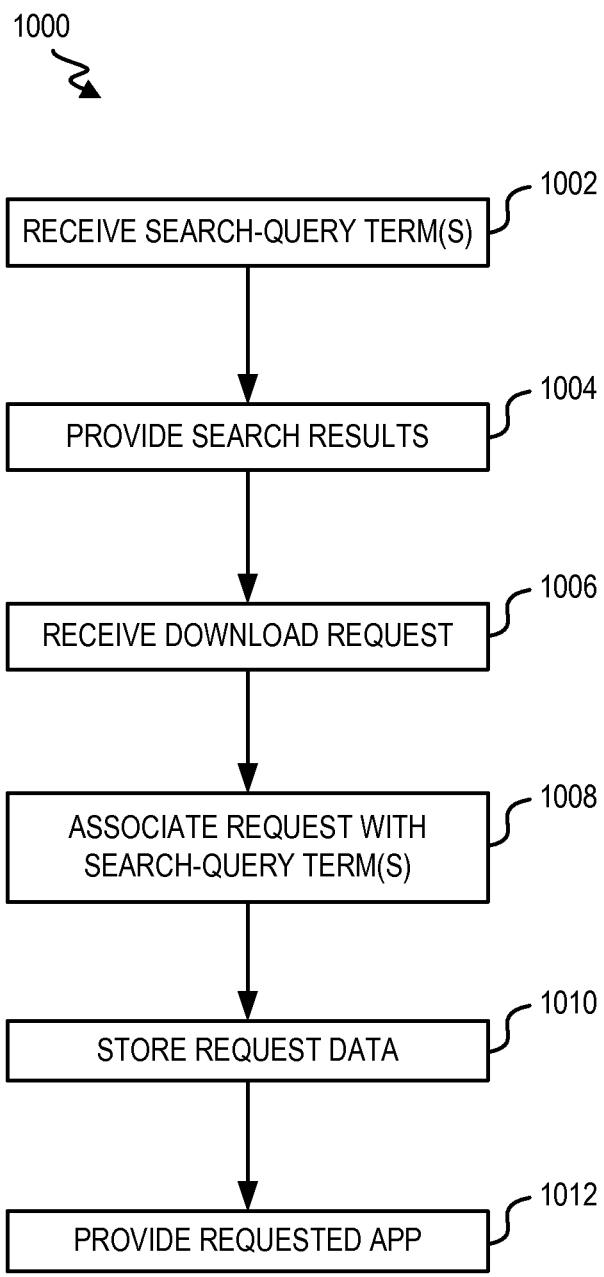
FIG. 10 is a flow diagram of a process for processing download requests according to an embodiment of the present invention.

FIG. 10 is a flow diagram of a process 1000 for processing download requests according to an embodiment of the present invention. Process 1000 can be implemented, e.g., in remote server 150 in FIG. 3.

At block 1002, one or more search-query terms are received from device 105. The search-query term(s) can be accompanied by data identifying device 105 and/or a user using device 105. In response to the query, remote server 150 can process the request and respond to the request by providing a set of search results at block 1004.

At block 1006, a request to download an app is received. The download request and the search-query term(s) can be received from a same user device 105. The download request can include data identifying device 105, a user using device 105, data identifying the requested app (e.g., a name or identification number), data identifying a search-result set identifying the requested app, and/or search-query terms precipitating a search-result set that identified the requested app.

At block 1008, the download request is associated with the search-query term(s). The association can be determined, e.g., by identifying a most recently received search query from a device or user associated with a download request, by determining a query associated with a set of search results identified in the download request, or by extracting search-query terms identified in the download request. This association can help to provide the empirical data for determining a serach category, as described above.

At block 1010, request data is stored (e.g., at empirical query database 316). The stored request data can include information pertaining to the download request, such as a name of the requested app, an identifier (e.g., an identification number) of the requested app, a date and/or time of the download request, and/or a price of the requested app. The stored data can also include information pertaining to the associated search-query term(s), such as the search-query term(s), processed versions of the search-query term(s) (e.g., correcting spelling, removing or adding capitalization, or changing plural/singular tenses), a date and/or time associated with the search query. In some instances, the download-request information is indexed according to the search-query term(s) or a processed version of the search-query term(s). The stored data can further include information such as characteristics and/or capabilities of a device 105 that transmitted the download request.

At block 1012, the requested app is provided. For example, the app can be retrieved from app database 160 and wirelessly transmitted to device 105.

Figure 11:
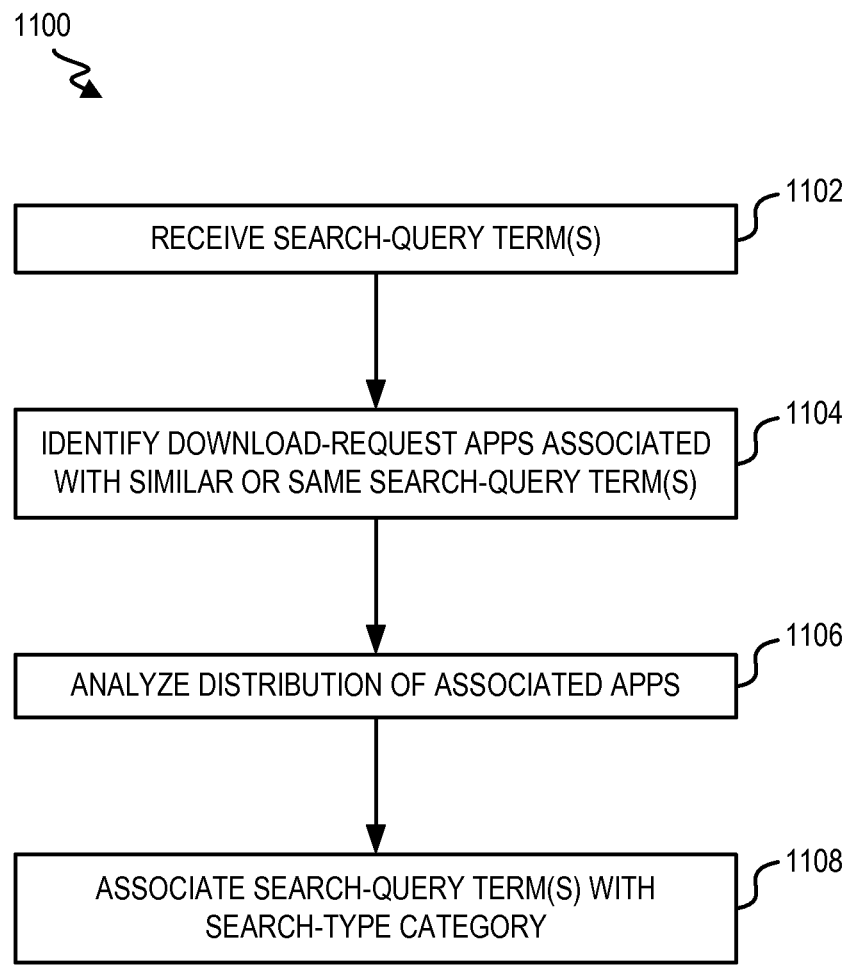
FIG. 11 is a flow diagram of a process for processing search queries based on empirical download requests according to an embodiment of the present invention.

FIG. 11 is a flow diagram of a process 1100 for processing search queries based on empirical download requests according to an embodiment of the present invention. Process 1100 can be implemented, e.g., in remote server 150 in FIG. 3.

At block 1102, one or more search-query terms are received from device 105 at remote server 150. At block 1104, app download requests associated with similar or same search-query term(s) are identified. For example, remote server 150 can search for download-request data within empirical query database 316 that is associated with (e.g., indexed by or in a shared data entry with) the similar or same search-query terms. In some instances, only app download requests associated with the same search-query term(s) are identified. In some instances, app download requests associated with similar search-query term(s) (e.g., different spelling, word order, or capitalization) are also identified. The identified app download requests can include requests associated with a particular time period (e.g., within the last year) or across all time. The identified app download requests can include requests associated with a device having similar device characteristics or capabilities as a device from which the search-query term(s) were received or can include requests irrespective of associated devices.

At block 1106, a distribution of the associated apps for which downloads were requested is generated, and the distribution is analyzed. The distribution can include an absolute count-based distribution or a normalized distribution. The distribution can include a cumulative or non-cumulative distribution. The analysis can include, e.g., identifying a slope of the distribution or a value of the distribution.

At block 1108, the search-query term(s) are associated with a search-type category based on the analysis of the distribution. The categorization can include, e.g., assessing criterion associated with specific categories, comparing category-specific scores generated at least in part based on the distribution to each other, comparing a category-specific score generated at least in part based on the distribution to a threshold, and/or identifying a default categorization (e.g., used if a criterion associated with one or more other categorizations is not satisfied). The categorization can also depend upon factors independent from the distribution (e.g., a number of words in the search-query term(s)). As described elsewhere herein, a search for an app can then be performed based on the search-query term(s) and the search-type category.

It will be appreciated that process 1000 and/or process 1100 can be modified to relate to other types of user interactions instead of or in addition to download requests. For example, at block 1006 of process 1000, a report of a "click" on an app, selection of an app or use of an app can be received, and that app can be associated with the search-query term(s) at block 1008. Similarly, at block 1104 of process 1100, app clicks, selections or uses can be identified, and the distribution analyzed at block 1106 can characterize the clicks, selections or uses.

Embodiments described herein can efficiently and effectively respond to users' search queries. Users can have different objectives while searching for apps. For example, some users are searching for a specific app which they know exist. Other users are searching for any app that performs a specific function. Still others want to merely peruse general apps related to a topic of interest. As disclosed herein, an analysis of terms in search queries and/or an analysis of empirical data associated with similar or same search queries can provide an estimate as to what type of search a user is attempting to perform. For example, searches for a specific app can be more likely to include capital letters and quotation marks, can be associated with fewer textual search results, and can frequently lead to a selection or download of a small subset of apps. As another example, searches for any app fulfilling a function can be more likely to include lower-case letters, can be associated with many textual search results, and can lead to a selection or download of a large variety of apps.

Many disclosures herein are tied to search queries for apps. It will be appreciated that the disclosures can be extended to search queries pertaining to other types of software, such as audio files (e.g., music files or podcast files) and/or video files. Similar or different categories could be used. For example, functional music search queries can include "Christmas music", "jazz standards" or "songs from the 80s", while navigational music search queries could include "White Christmas", "Take the A Train" or "Simply Irresistible". As another example, functional movie search queries can include "gen x movies", "romcoms", or "scifi", while navigation movie search queries could include "Breakfast Club", "Wedding Singer" or "Avatar". A functional podcast search query could include "baseball podcast", while a navigational podcast search query could include "Baseball America". A functional ringtone search query could include "novelty ringtones".

Upon identifying a search-type category, a search technique can be appropriately chosen. Searches estimated to be for a specific app can return search results with multiple textual hits in metadata and with exact-term matches. Searches estimated to be for any app fulfilling a function can return search results having same or similar terms in the title or metadata and high user popularity. Thus, the quality of search results can be improved, and processing expenses can be reduced (e.g., by only performing necessary searches and avoiding users' efforts to repeat a search with different terms).

Portions of the description can refer to particular user interfaces, such as touchscreen displays. Other embodiments can use different interfaces. For example, a user interface can be voice-based, with the user speaking instructions into a microphone or other audio input device and the device providing an audible response (e.g., using synthesized speech or pre-recorded audio clips). A combination of voice-based and visual interface elements can be used, and in some embodiments, multiple different types of interfaces can be supported, with the user having the option to select a desired interface, to use multiple interfaces in combination (e.g., reading information from the screen and speaking instructions) and/or to switch between different interfaces. Any desired form of user interaction with a device can be supported.

Embodiments of the present invention can be realized using any combination of dedicated components and/or programmable processors and/or other programmable devices. The various processes described herein can be implemented on the same processor or different processors in any combination. Accordingly, where components are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes can use different techniques, or the same pair of processes can use different techniques at different times. Further, while the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded and stored on various computer readable storage media; suitable media include magnetic disk or tape, optical storage media such as compact disk (CD) or DVD (digital versatile disk), flash memory, and other non-transitory media. Computer readable media encoded with the program code can be packaged with a compatible electronic device, or the program code can be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method of responding to a search query requesting relevant software applications from a database of software applications, the method comprising:
   receiving, at a server, the search query from an electronic device of a user, the search query including one or more terms;
   analyzing the one or more terms to assign a first search category to the search query, the first search category being selected from a plurality of potential categories, wherein the potential categories include a navigational category and a functional category;
   determining a search technique based on the first search category, the navigational category being searched based on text associated with the software applications in the database, and the functional category being searched based on a function of the software application in the database and wherein the search technique determines whether a first search is performed or a second search is performed;
   using the determined search technique to search, at the server, the database for one or more relevant software applications based on the search query; and sending, to the electronic device, a list of the one or more relevant software applications; wherein analyzing the one or more terms comprises identifying a set of previous search queries from other users including the term or an equivalent term; and identifying, for each search query in the set of previous search queries, an application selected or downloaded by a respective other user subsequent to receiving results from the previous search query; and analyzing a distribution over the selected or downloaded applications; and wherein analyzing the distribution includes:

determining a statistical value of the distribution; and comparing the statistical value to a threshold, wherein the functional category is assigned to the search query when the statistical value exceeds the threshold.

2. The method of claim 1, wherein the statistical value is an area under the distribution for the N most selected or downloaded software applications, where N is an integer greater than three.

3. The method of claim 1, wherein determining the search technique based on the first search category comprises searching for the one or more terms within titles, metadata or text associated with the software applications in the database.

4. The method of claim 1, wherein assigning the search query to a search-type category comprises searching for the term in a look-up table.

5. The method of claim 4, wherein the look-up table is repeatedly updated based on an identification of which applications were selected or downloaded by users subsequent to presentations of search-query results to the users.

6. The method of claim 1, wherein the term comprises a set of words.

7. The method of claim 1, wherein the server is remote from the electronic device, and wherein initiating the presentation of the results of the search to the user of the electronic device comprises transmitting the results of the search to the electronic device.

8. A non-transitory computer-readable storage medium containing program instructions, which when executed by a processor cause the processor to execute a method of responding to a search query requesting relevant software applications from a database of software applications, the method comprising:

receiving, at a server, the search query from an electronic device of a user, the search query including one or more terms;

analyzing the one or more terms to assign a search category to the search query, the search category being selected from a plurality of potential search categories, wherein each category of the plurality of potential search categories relates to a different search technique for searching the database of software applications, wherein a first search technique emphasizes exact textual matches more than a second search technique emphasizes exact textual matches, and wherein the analysis utilizes empirical data associated with the one or more terms;

determining a search technique based on the search category;

using the determined search technique to search, at the server, the database for one or more relevant software applications based on the search query; and sending, to the electronic device, a list of the one or more relevant software applications; wherein analyzing the one or more terms comprises:

identifying a set of previous search queries from other users including the term or an equivalent term;

identifying, for each search query in the set of previous search queries, an application selected or downloaded by a respective other user subsequent to receiving results from the previous search query; and analyzing a distribution over the selected or downloaded applications; and wherein analyzing the distribution includes:

determining a statistical value of the distribution; and comparing the statistical value to a threshold, wherein the functional category is assigned to the search query when the statistical value exceeds the threshold.

9. The computer-readable medium of claim 8 wherein the first search technique comprises a navigational search technique and the second search technique comprises a functional search technique.

10. The computer-readable medium of claim 8 wherein the empirical data includes data identifying other users' downloads of software applications subsequent to initiating same or equivalent search queries.

11. The computer-readable medium of claim 8 wherein the analysis further depends on a capitalization, number of words, or punctuation used in the search query.

12. A non-transitory machine readable medium storing instructions which when executed by a processing system cause the processing system to perform a method of responding to a search query requesting relevant software applications from a database of software applications, the method comprising:

receiving, at a server, the search query from an electronic device of a user, the search query including one or more terms;

analyzing the one or more terms to assign a first search category to the search query, the first search category being selected from a plurality of potential categories, wherein the potential categories include a navigational category and a functional category;

determining a search technique based on the first search category, the navigational category being searched based on text associated with the software applications in the database, and the functional category being searched based on a function of the software application in the database and wherein the search technique determines whether a first search is performed or a second search is performed;

using the determined search technique to search, at the server, the database for one or more relevant software applications based on the search query; and sending, to the electronic device, a list of the one or more relevant software applications; wherein analyzing the one or more terms comprises identifying a set of previous search queries from other users including the term or an equivalent term; and identifying, for each search query in the set of previous search queries, an application selected or downloaded by a respective other user subsequent to receiving results from the previous search query; and analyzing a distribution over the selected or downloaded applications; and wherein analyzing the distribution includes:

determining a statistical value of the distribution; and comparing the statistical value to a threshold, wherein the functional category is assigned to the search query when the statistical value exceeds the threshold.

13. The non-transitory machine readable medium as in claim 12 wherein the statistical value is an area under the distribution for the N most selected or downloaded software applications, where N is an integer greater than three.

14. The non-transitory machine readable medium as in claim 12 wherein determining the search technique based on the first search category comprises searching for the one or more terms within titles, metadata or text associated with the software applications in the database.

15. The non-transitory machine readable medium as in claim 12 wherein assigning the search query to a search-type category comprises searching for the term in a look-up table.

16. The non-transitory machine readable medium as in claim 15 wherein the look-up table is repeatedly updated based on an identification of which applications were selected or downloaded by users subsequent to presentations of search-query results to the users.

17. The non-transitory machine readable medium as in claim 12 wherein the term comprises a set of words.

18. The non-transitory machine readable medium as in claim 12 wherein the server is remote from the electronic device, and wherein initiating the presentation of the results of the search to the user of the electronic device comprises transmitting the results of the search to the electronic device.

* * * * *